United States Patent [19]
Allison et al.

[11] 3,860,259

[45] Jan. 14, 1975

[54] REAR SUSPENSION SYSTEM FOR MOTOR VEHICLE

[75] Inventors: William D. Allison, Grosse Pointe Farms, Mich.; Donald G. Sippel, Basildon, England

[73] Assignee: Ford Motor Company, Dearborn, Mich.

[22] Filed: Dec. 3, 1973

[21] Appl. No.: 421,475

[52] U.S. Cl. .............................. 280/124 R, 267/18
[51] Int. Cl. ............................................ B60g 11/58
[58] Field of Search............ 280/124 R; 267/15, 18, 267/21 R

[56] References Cited
UNITED STATES PATENTS
3,444,947  5/1969  Stocks.................................. 180/71
3,599,955  8/1971  Yew..................................... 280/124

*Primary Examiner*—Philip Goodman
*Attorney, Agent, or Firm*—Clifford L. Sadler; Keith L. Zerschling

[57] ABSTRACT

A rear suspension system for a motor vehicle according to this disclosure has a pair of cantilever leaf springs that are supported at their forward ends in channel shape portions of the vehicle chassis and pivotally connected at their rearward ends to bracket assemblies secured to an axle tube. A pair of telescopic shock absorber struts interconnect the chassis and the axle tube bracket assemblies. The struts are rigidly secured to the bracket assemblies and function as reaction means to prevent axle windup that might otherwise result from acceleration or braking.

14 Claims, 5 Drawing Figures

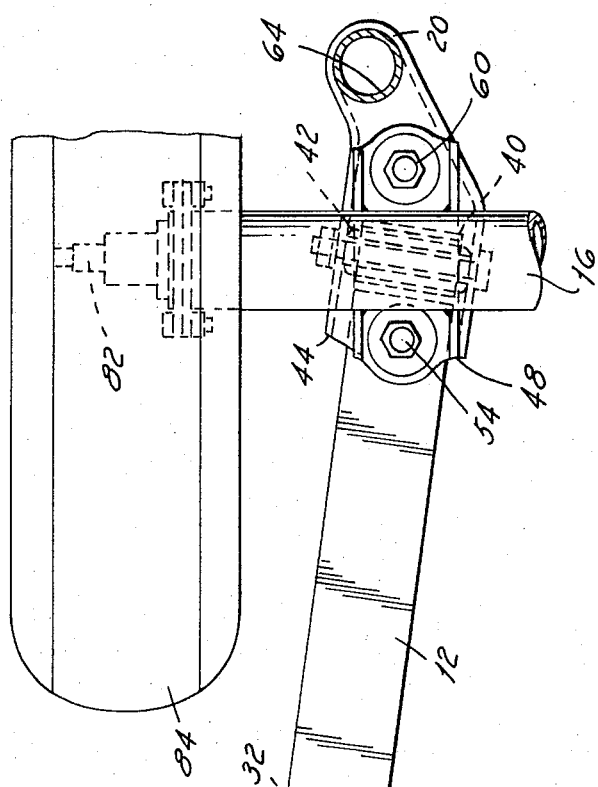
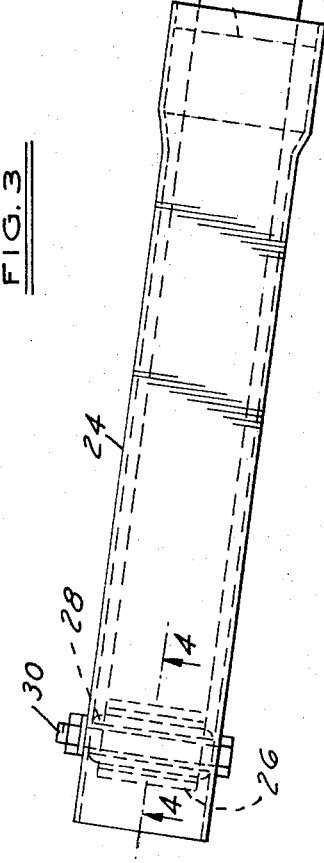
FIG. 3
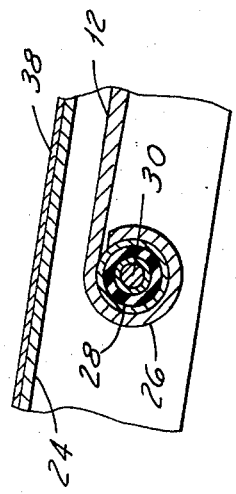
FIG. 4

REAR SUSPENSION SYSTEM FOR MOTOR VEHICLE

BACKGROUND AND SUMMARY OF THE DISCLOSURE

In accordance with the present invention, a suspension system for a motor vehicle is characterized by its simplicity of construction and economy of manufacture. In the preferred embodiment of the invention, left and right cantilever leaf springs are mounted in channel members in the rocker panel areas of the vehicle body and extends rearward to a point below the axis of the rear wheels.

The forward end of each spring is pivotally connected to the vehicle sprung mass by a resilient bushing. A steady rest is interposed between a midportion of the spring and its channel member. The steady rest transmits vertical and side forces from the spring to the top and sides of the channel. The steady rest may be formed of rubber and bonded or otherwise secured to either the spring or the channel member.

The two cantilever springs may be splayed outwardly slightly as they extend forwardly. In addition, they may be canted upwardly or downwardly to obtain desired steering or packaging objectives.

The rear end of each spring is pivotally attached to a bracket rigidly secured to the base of a telescopic shock absorber strut. The upper end of the strut is secured to the vehicle body by conventional resilient bushings. The struts are angled forwardly as they extend upwardly for the purpose of providing increased trunk space.

Each bracket joining a spring and a strut provides a platform on which the axle tube may be mounted through two pairs of rubber grommets.

A suspension in accordance with this invention may be employed for either a live (driven) rear axle or a beam rear axle for a vehicle having front wheel drive.

The cantilever springs provide four major functions. The springs are constructed to (1) transmit load and spring rate to the rear wheels; (2) locate the rear axle longitudinally; (3) locate the axle transversely with a slight rate of lateral compliance; and (4) provide the desired roll and compliance steer effects. The rigid connection between the lower end of the shock absorber struts and the bracket permits the struts, in association with the leaf springs, to function as a reaction member for brake torque.

BRIEF DESCRIPTION OF THE DRAWINGS

The many objects and advantages of a motor vehicle suspension constructed in accordance with this invention will become apparent upon consideration of the following detailed description and the accompanying drawings, in which:

FIG. 3 is a top plan view of the right side of the suspension;

FIG. 4 is a sectional view taken along section line 4—4 of FIG. 3; and

FIG. 5 is a sectional view taken along section line 5—5 of FIG. 2.

DETAILED DESCRIPTION OF THE PREFERRED EMBODIMENT

Figure 1:
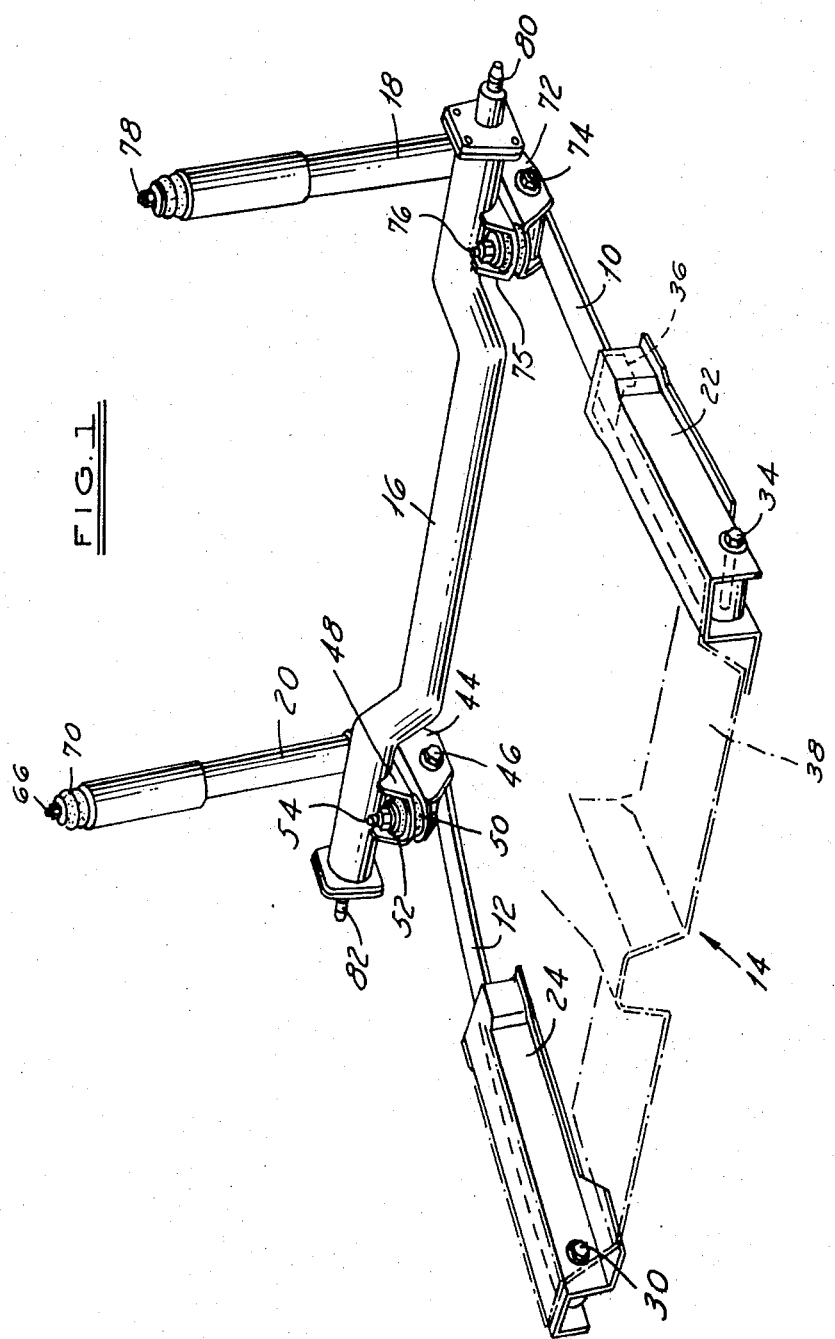
FIG. 1 is a perspective view of a rear suspension system embodying the preferred form of the invention.

Referring now to the drawings wherein the presently preferred embodiment of the invention is shown, FIG. 1 illustrates a rear suspension system for a motor vehicle. The suspension of FIG. 1 includes left and right cantilever leaf springs 10 and 12 that interconnect the vehicle body 14 and an axle tube 16. A pair of telescopic hydraulic dampers or shock absorber struts 18 and 20 also interconnect the axle tube 16 and the vehicle body 14.

The vehicle body 14 includes left and right channel members 22 and 24 that are situated in the rocker panel areas of the body. The channel members 22 and 24 open downwardly and enclose the forward half of the cantilever leaf springs 10 and 12.

Figure 2:
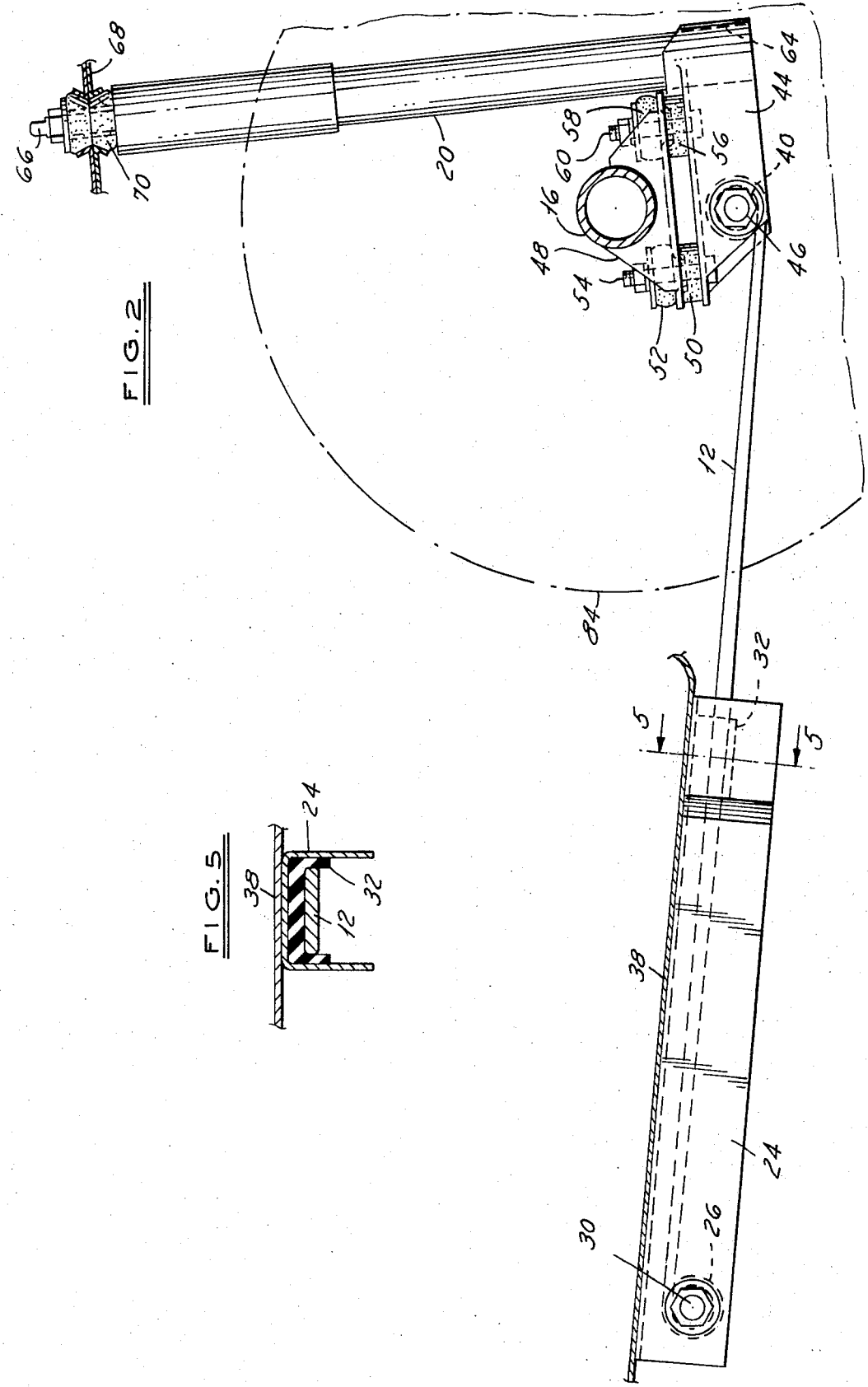
FIG. 2 is a side elevational view of the rear suspension of FIG. 1.

Referring to FIGS. 2 and 3, the channel member 24 is enclosed about the forward half of the leaf spring 12. The forward end of the spring 12 is formed with an eye 26 in which a resilient bushing 28 is positioned. A transverse bolt 30 extends through the bushing 28 and secures a forward end of the spring 12 to the sidewalls of the channel member 24.

A U-shape rubber member 32 (FIG. 5) constitutes a steady rest and is bonded to the upper surface of the leaf spring 12 near its midpoint. The rubber steady rest 32 is interposed between the top and sides of the spring 12 and the top wall and sidewalls of the channel member 24.

The left cantilever spring 10 is similarly connected to the channel member 22. As shown in FIG. 1, a bolt 34 pivotally connects an eye at the forward end of the spring 10 to the sidewalls of the channel member 22. A resilient bushing similar to bushing 28 is interposed between the bolt 34 and the eye at the end of the spring 10. A steady rest 36 provides a support for the channel member 22 on the midportion of the spring 10.

A sheet metal member 38, which forms a floor of the vehicle body, extends between the channel members 22 and 24.

Resilient pivot means are provided for connecting the rearward ends of the leaf springs 10 and 12 to the axle tube 16. The rearward end of the spring 12 is formed with an eye 40 similar in construction to the eye 26. A resilient bushing 42 is positioned in the eye 40. The eye 40 and bushing 42 are situated between the sidewalls of a generally channel shape bracket 44. A bolt 46 extends through the sidewalls of the bracket 44 and connects the bushing 42 and eye 40 to the bracket.

A bracket 48 is welded to the axle tube 16 adjacent its right end. Two pairs of resilient grommets are are provided to connect the bracket 44 to the axle bracket 48. A first pair of grommets 50 and 52 is situated at the forward end of the brackets 44 and 48. A threaded fastener 54 extends through appropriate holes in the brackets 44, 48 and through the centers of the grommets 50, 52. In a similar fashion, a pair of grommets 56 and 58 is secured to the brackets 44, 48 by a threaded fastener 60.

With this construction, the brackets 44 and 48 are combined to form a two-piece bracket assembly. The rubber grommets 50, 52, 56 and 58 provide a hinge having a longitudinal axis between the brackets 44 and 48.

The telescopic shock absorber strut 20 has its pressure tube portion fitted into and rigidly secured to a socket portion 64 formed in the bracket 44. The extending piston rod end 66 of the shock absorber strut 20 is connected to body sheet metal 68 by a conventional rubber grommet construction 70.

In a similar fashion, the left leaf spring 10 is connected to the channel shape bracket 72 by means of a bolt 74 that passes through a resilient bushing contained within an eye formed at the rearward end of the spring 10. A channel shape bracket 75 is welded to the outer end of the axle tube 16. The brackets 72 and 75 are connected by two pairs of rubber grommets (similar to the rubber grommets 50, 52, 56 and 58) and appropriate fasteners. A threaded fastener 76 passes through one of the pair of grommets.

The left shock absorber strut 18 has its lower end rigidly secured to the bracket 72. The end of the piston rod 78 of the shock absorber strut 18 is connected to a sheet metal panel of the vehicle body 14.

In the illustrated embodiment of the invention, the axle tube 16 supports spindle members 80 and 82 at its left and right ends. The spindles 80 and 82, in turn, rotatably support a pair of rear vehicle wheels such as the right rear wheel and tire assembly 84 shown in FIGS. 2 and 3.

In the illustrated embodiment of the invention, the suspension is intended for a front wheel drive vehicle. The axle tube 16 is a dead axle and the rear wheels are rotatably supported on the spindles 80 and 82. It should be understood, however, that the suspension of the present invention is equally adaptable to a live or driven rear axle.

OPERATION

The cantilever springs 10 and 12, in combination with the manner in which they are supported in the channel members 22 and 24, provide four major functions. The springs 10, 12 operate to (1) transmit load and spring rate to the rear wheels; (2) locate the axle longitudinally; (3) locate the axle transversely with a selected rate of lateral compliance; and (4) provide desired roll and compliance steer effects.

The resilient mounts between the brackets 48, 75 that are rigid with the rear axle tube 16 and the brackets 44, 72 that are rigid with the base of the shock absorber struts 18 and 20 provide a means for tuning the rear axles for a desired limited rate of torsional windup. Selection of the rubber grommets with the appropriate hardness will provide the desired rate. This is especially important for rear drive vehicles. This construction also improves braking with front drive vehicles.

The resilient connections between the brackets 44, 48 and between the brackets 72, 75 serve as a flexible hinge for lateral movement of the upper pivots of the struts 18, 20 during body roll or nonparallel axle translation.

Side forces from the sprung to the unsprung mass are transmitted at the midpoint of the resilient mounts connecting the axle brackets 48, 75 to brackets 44, 72 which are connected to the springs 10, 12 and struts 18, 20. The resiliency of the mounts permits lateral compliance of the body with respect to the axle 16. Favorable ride and handling characteristics will result from such compliance.

The weight of the vehicle body is supported on the axle tube 16 by the springs 10 and 12 through the rubber steady rests 32 and 36 and the resilient bushings at the forward ends of the springs. During braking, rotation of the axle 16 is resisted by the struts 18 and 20 which are rigidly secured to the brackets 72 and 44.

Depending upon the direction of wheel rotation when the wheel brakes are applied, different ones of the grommets are loaded in compression. At the same time, certain ones of the threaded fasteners will be loaded in tension. These elements function to transmit the braking load from the axle 16 to the struts 18 and 20. For an example, when the wheel 84 is rotating in the forward direction (counterclockwise in FIG. 2) and the brakes are applied, grommets 50 and 58 will be loaded in compression and the bolt 60 will be loaded in tension.

Jounce and rebound stops are constructed into the shock absorber struts 18 and 20. When the struts 18 and 20 are fully extended during extreme rebound, the resilient elements 36 and 32 will remain in full engagement with both the leaf springs 10, 12 and the channel members 22, 24.

The foregoing description presents the presently preferred embodiment of this invention. Modifications and alterations may occur to those skilled in the art that will come within the scope and spirit of the following claims.

We claim:

1. A suspension system for a motor vehicle having a transversely extending rigid axle,
    left and right road wheels rotatably supported at the outer ends of said axle,
    vehicle body structure,
    left and right axle positioning members having their forward ends pivotally connected to said body structure,
    left and right bracket means,
    said left and right axle positioning members being pivotally connected to said left and right bracket means, respectively,
    left and right telescopic shock absorbers,
    said shock absorbers having their lower ends rigidly secured to said left and right bracket means and their upper ends connected to said body structure,
    resilient means connecting said bracket means to said axle housing,
    said resilient means defining a longitudinal extending pivot axis between each of said brackets and said axle.

2. A suspension system for a motor vehicle having a transversely extending rigid axle,
    left and right road wheels rotatably supported at the outer ends of said axle,
    vehicle body structure,
    left and right generally longitudinally extending leaf springs having their forward ends connected to said body structure,
    load bearing means interposed between said body structure and a midpoint of said leaf springs,
    left and right bracket means,
    the rearward ends of said left and right leaf springs being pivotally connected to said left and right bracket means, respectively,
    left and right telescopic shock absorbers,
    said left and right shock absorbers having their lower ends rigidly secured to said left and right bracket means and their upper ends connected to said body structure,
    means connecting said left and right bracket means to said axle.

3. A motor vehicle suspension system according to claim 2 and including:
said body structure including left and right channel members,
the forward portions of said leaf springs being situated in said channel members.

4. A motor vehicle suspension system according to claim 2 and including:
said body structure including left and right channel members,
the forward portions of said leaf springs being situated in said channel members,
said load bearing members each comprising a generally U-shape resilient element interposed between one of said leaf springs and one of said channel members.

5. A motor vehicle suspension system according to claim 4 and including:
each of said U-shape resilient elements being of elastomeric construction and bonded to one of said leaf springs and channel members.

6. A motor vehicle suspension system according to claim 2 and including:
said means connecting said left and right bracket means to said axle being laterally resilient.

7. A motor vehicle suspension system according to claim 2 and including:
left and right axle brackets secured to said axle,
resilient attachment means securing said left and right bracket means to said left and right brackets.

8. A motor vehicle suspension system according to claim 2 and including:
left and right axle brackets secured to said axle,
resilient attachment means securing said left and right bracket means to said left and right axle brackets,
said attachment means comprising longitudinally spaced apart resilient elements.

9. A motor vehicle suspension system according to claim 2 and including:
said body structure including left and right channel members,
the forward ends of said leaf springs being situated in said channel members,
said load bearing members each comprising a resilient element interposed between one of said leaf springs and one of said channel members,
left and right axle brackets secured to said axle,
resilient attachment means securing said left and right bracket means to said left and right axle brackets,
said attachment means comprising longitudinally spaced apart resilient elements.

10. A suspension system for a motor vehicle having a transversely extending rigid axle,
left and right road wheels rotatably supported at the outer ends of said axle,
vehicle body structure,
left and right axle positioning members having their forward ends pivotally connected to said body structure,
left and right brackets,
said left and right axle positioning members being pivotally connected to said left and right brackets, respectively,
left and right telescopic shock absorbers,
said shock absorbers having their lower ends rigidly secured to said left and right brackets and their upper ends connected to said body structure,
means connecting said left and right brackets to said axle housing,
said left and right shock absorbers being constructed to resist rotation of said axle about the axis of said wheels.

11. A suspension system for a motor vehicle according to claim 10 and including:
said means including resilient elements operatively interposed between said brackets and said axle housing.

12. A suspension system for a motor vehicle having a transversely extending rigid axle,
left and right road wheels rotatably supported at the outer ends of said axle,
vehicle body structure,
left and right longitudinally extending leaf springs having their forward ends connected to said body structure,
left and right brackets,
said left and right leaf springs being connected to said left and right brackets, respectively,
left and right telescopic shock absorbers,
said left and right shock absorbers having their lower ends rigidly secured to said left and right brackets and their upper ends connected to said body structure,
means connecting said left and right brackets to said axle,
said left and right shock absorbers being constructed to resist rotation of said axle about the axis of said wheels.

13. A suspension system for a motor vehicle according to claim 12 and including:
said means including resilient elements operatively interposed between said brackets and said axle housing.

14. A suspension system for a motor vehicle according to claim 12 and including:
said left and right leaf springs being pivotally connected to said left and right brackets.

* * * * *

UNITED STATES PATENT OFFICE
CERTIFICATE OF CORRECTION

PATENT NO. : 3,860,259
DATED : January 14, 1975
INVENTOR(S) : William D. Allison and Donald G. Sippel It is certified that error appears in the above-identified patent and that said Letters Patent are hereby corrected as shown below:

Column 4, line 43, change "axle housing" to -- axle --.

Column 6, line 16, change "axle housing" to -- axle --;

line 24, delete "housing";

line 50, delete "housing".

Signed and Sealed this twenty-sixth Day of August 1975

[SEAL]

Attest:

RUTH C. MASON
Attesting Officer

C. MARSHALL DANN
Commissioner of Patents and Trademarks